US011584223B2

(12) United States Patent
Peters et al.

(10) Patent No.: US 11,584,223 B2
(45) Date of Patent: Feb. 21, 2023

(54) TRANSMISSION SUBASSEMBLY, CLUTCH MODULE AND VEHICLE

(71) Applicant: DEERE & COMPANY, Moline, IL (US)

(72) Inventors: Josef Peters, Mannheim (DE); Christoph Eisenhardt, Mannheim (DE); Stefan Raisch, Vaihingen/Enz (DE); Thomas Busold, Bruehl (DE); Clayton P. Neumann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 49 days.

(21) Appl. No.: 17/301,048

(22) Filed: Mar. 23, 2021

(65) Prior Publication Data
US 2021/0394613 A1 Dec. 23, 2021

(30) Foreign Application Priority Data
Jun. 23, 2020 (DE) .......................... 102020207779.7

(51) Int. Cl.
*F16H 57/02* (2012.01)
*B60K 23/02* (2006.01)
*B60K 17/346* (2006.01)
*B60K 17/354* (2006.01)
*B60K 17/356* (2006.01)

(52) U.S. Cl.
CPC ............ *B60K 23/02* (2013.01); *B60K 17/346* (2013.01); *B60K 17/354* (2013.01); *B60K 17/356* (2013.01); *B60Y 2200/221* (2013.01); *F16H 2057/02013* (2013.01)

(58) Field of Classification Search
CPC .... B60K 23/02; B60K 17/346; B60K 17/354; B60K 17/356; B60K 17/06; B60K 17/08; B60K 23/08; B60K 17/02; B60K 17/00; B60Y 2200/221; B60Y 2200/22; B60Y 2200/41; F16H 2057/02013; F16H 57/021; F16H 2057/02026
See application file for complete search history.

(56) References Cited

U.S. PATENT DOCUMENTS

| 6,206,128 | B1 | 3/2001 | Hattori et al. | |
|---|---|---|---|---|
| 7,398,853 | B2* | 7/2008 | Ohtsuki | F16H 37/043 180/311 |
| 2002/0026853 | A1* | 3/2002 | Matsufuji | F16H 37/043 74/745 |
| 2005/0039807 | A1 | 2/2005 | Ford et al. | |

(Continued)

FOREIGN PATENT DOCUMENTS

| DE | 60127348 T2 | 11/2007 |
|---|---|---|
| EP | 0797008 B1 | 5/2001 |

(Continued)

OTHER PUBLICATIONS

European Search Report issued in European Patent Application No. 21179204.9, dated Aug. 24, 2021, 7 pages.

*Primary Examiner* — Justin Holmes

(57) ABSTRACT

A transmission subassembly for a working vehicle includes an engageable front wheel drive, a transmission housing, a clutch module, and a hydraulic module. The hydraulic module is received between the clutch module and the transmission housing.

17 Claims, 6 Drawing Sheets

(56) References Cited

U.S. PATENT DOCUMENTS

2005/0205386 A1    9/2005   Reed et al.
2015/0132163 A1    5/2015   Wright et al.

FOREIGN PATENT DOCUMENTS

| EP | 1398513 A3 | 6/2005 | |
|----|---|---|---|
| KR | 20170027992 A * | 3/2017 | |
| WO | WO-2016185796 A1 * | 11/2016 | ............. F16H 47/02 |

* cited by examiner

TRANSMISSION SUBASSEMBLY, CLUTCH MODULE AND VEHICLE

RELATED APPLICATIONS

This application claims priority to German Application No. 102020207779.7, filed Jun. 23, 2020, the disclosure of which is hereby expressly incorporated by reference in its entirety.

FIELD OF THE DISCLOSURE

The present disclosure relates to a transmission subassembly for a vehicle, in particular an agricultural or industrial working vehicle, comprising an engageable front wheel drive, having a transmission housing, a clutch module and a hydraulic module, a clutch module for a transmission subassembly and a vehicle, in particular an agricultural or industrial working vehicle, having a transmission subassembly.

BACKGROUND

Utility vehicles and other all-terrain vehicles may be provided with a mechanical front wheel drive in order to drive the front wheels, for example, in order to improve the traction. The front wheel drive or a clutch module of the front wheel drive is generally provided on or usually below a transmission housing. A front wheel drive shaft of the front wheel drive is arranged such that it may be connected to a front axle of the vehicle in order to drive the front wheels of the vehicle. A hydraulic supply unit with various connectors, via which the front wheel drive may also be supplied with a lubricating or hydraulic medium, is frequently provided in a front region of the transmission housing. Such an arrangement is complex or impedes the repair or replacement of the front wheel drive or the clutch module.

Thus, there is a need to provide a transmission subassembly, a clutch module and vehicle by which the aforementioned drawbacks are remedied.

SUMMARY

According to the present disclosure, a transmission subassembly for a vehicle having an engageable front wheel drive has a transmission housing, a clutch module and a hydraulic module, wherein the hydraulic module is received between the clutch module and the transmission housing. Such an arrangement, which may also be described in a simplified manner as a sandwich construction, results in a compact structure. Moreover, the front wheel drive or the clutch module of the front wheel drive and the hydraulic module may be entirely or partially fitted onto or dismantled from the transmission housing in a particularly simple manner. The access to components may be simplified and thus a simpler accessibility, for example, for replacement or repair may be achieved. The transmission subassembly may be configured in a simpler manner and optionally to be more lightweight since the number of hydraulic connectors or seals or sealing mechanisms, the length or number of hydraulic lines may be reduced or a direct connection of the hydraulic components or modules may be achieved. The vehicle, in particular, is an agricultural or industrial working vehicle, such as in the manner of a field tractor or a tractor. However, the vehicle may also be an agricultural harvesting machine, a self-propelled sprayer, a construction vehicle, a transport/traction vehicle or any other suitable vehicle, in particular a utility vehicle.

If the clutch module and the hydraulic module are provided on a front region or a region of the transmission housing facing the front wheels of the vehicle, this may promote a compact design, in particular by the clutch module being able to be arranged as close as possible to a front axle or the front wheels to be driven by the front wheel drive.

A particularly simple construction may be achieved if the hydraulic module has a connecting module and a closing plate. The connecting module may in this case have one or even a multiplicity or plurality of hydraulic connectors, for example, for the supply or discharge of lubricating or hydraulic medium. The closing plate may close the hydraulic module relative to the surroundings or may be fastened together therewith to the transmission housing. Within the meaning of the aforementioned sandwich construction, the connecting module may adjoin the transmission housing and the closing plate may adjoin the clutch module.

An even more compact design may be achieved if the closing plate has at least one bearing for supporting at least one shaft. This shaft may be a front wheel drive shaft, which is provided in order to be able to be connected to a front axle or the front wheels of the vehicle such that these components may be driven, or a transmission shaft, the front wheel drive being able to be operatively connected thereby to a drive of the vehicle.

In order to simplify or facilitate the assembly or orientation of the connecting module and the closing plate during assembly, at least one locating pin, such as cooperating with corresponding locating openings in the connecting module or the connecting plate, may be provided between the connecting module and the closing plate. It is particularly advantageous if two locating pins which are spaced apart vertically or horizontally are provided.

If at least one fastening mechanism is provided, the clutch module and the hydraulic module or the clutch module or the hydraulic module being connected thereby to the transmission housing, this results in a simplified construction since a reduced number of fastening mechanism is used for fastening the aforementioned components.

A particularly simple assembly or dismantling may be achieved if the at least one fastening mechanism is provided to be releasable, such as in the manner of a screw connection.

It is particularly advantageous if the clutch module has a clutch housing, for receiving a clutch for engaging, in particular, a mechanical front wheel drive, and a front wheel drive shaft which extends at least substantially horizontally from the transmission housing to the front or in the direction of the front wheels.

A clutch module for such a transmission subassembly has a clutch housing, a front wheel drive shaft and a clutch for selectively connecting the front wheel drive shaft to a drive of the vehicle.

It is advantageous if a vehicle has at least one transmission subassembly as described above. In this manner, for example, the complexity of the vehicle may be reduced, constructional space may be saved or used elsewhere or the vehicle may be produced cost-effectively. The vehicle, in particular, is an agricultural or industrial working vehicle, such as in the manner of a field tractor or a tractor. However, the vehicle may also be an agricultural harvesting machine, a self-propelled sprayer, a construction vehicle, a transport/traction vehicle or any other suitable vehicle, in particular a utility vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
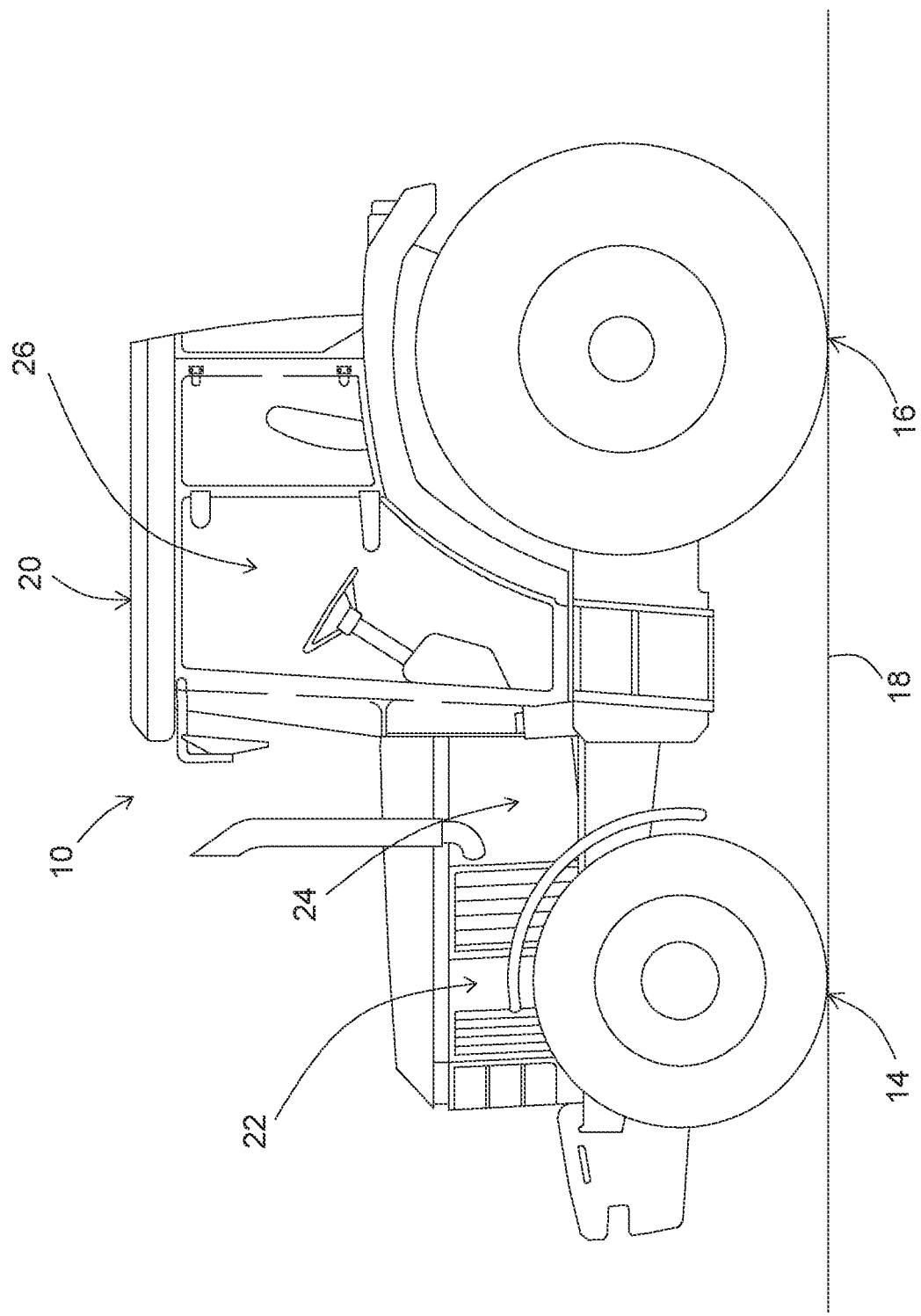
FIG. 1 shows a side view of an agricultural vehicle with a drive and a transmission subassembly.

FIG. 1 of the drawing shows an agricultural vehicle 10, in the manner of a field tractor or tractor, which is supported via front and rear wheels 14, 16 on a chassis or substrate 18. The vehicle 10 has a cab 20 in which an operator station 22 is arranged. Moreover, a drive 24 shown by way of indication and a transmission subassembly 26 are provided.

Figure 2:
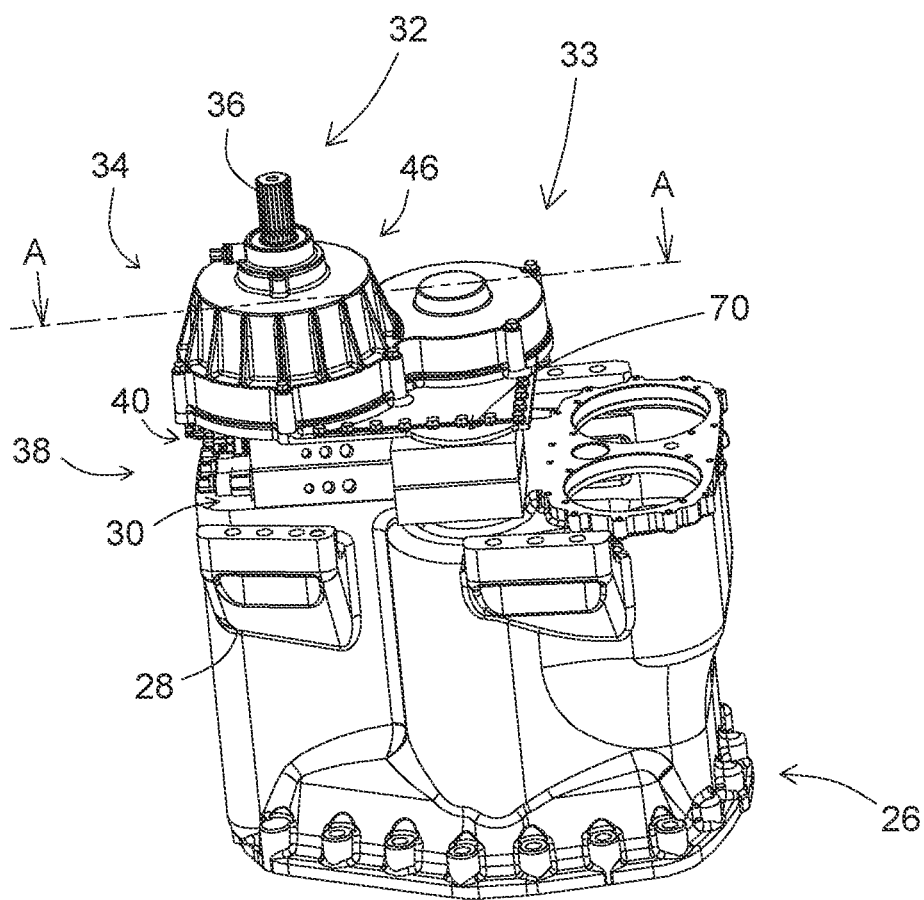
FIG. 2 shows the transmission subassembly with a transmission housing, a hydraulic module and a clutch module in an enlarged view.

For clarification, reference is now also made to FIG. 2 of the drawing. The transmission subassembly 26 has a transmission housing 28, a hydraulic module 30 and a front wheel drive 32, if required a front axle or the front wheels 14 of the vehicle 10 being able to be driven thereby. The front wheel drive 32 and the hydraulic module are assembled in a front region 33 of the transmission housing 28, wherein the front wheel drive 32 has a hydraulically actuatable front wheel drive-clutch module, which will be denoted hereinafter for short as the clutch module 34, with a front wheel drive shaft 36. The clutch module 34 may be actuated manually by an operator or even automatically in order to connect selectively a front axle, not shown, or the front wheels 14 to the drive 24.

The hydraulic module 30 has a connecting module 38 with a plurality of connectors 40 for supplying and discharging hydraulic and lubricating medium to the transmission subassembly 26, and a closing plate 42, the clutch module 34, a clutch housing 44 and a clutch 46, further details thereof being provided hereinafter.

Figure 3:
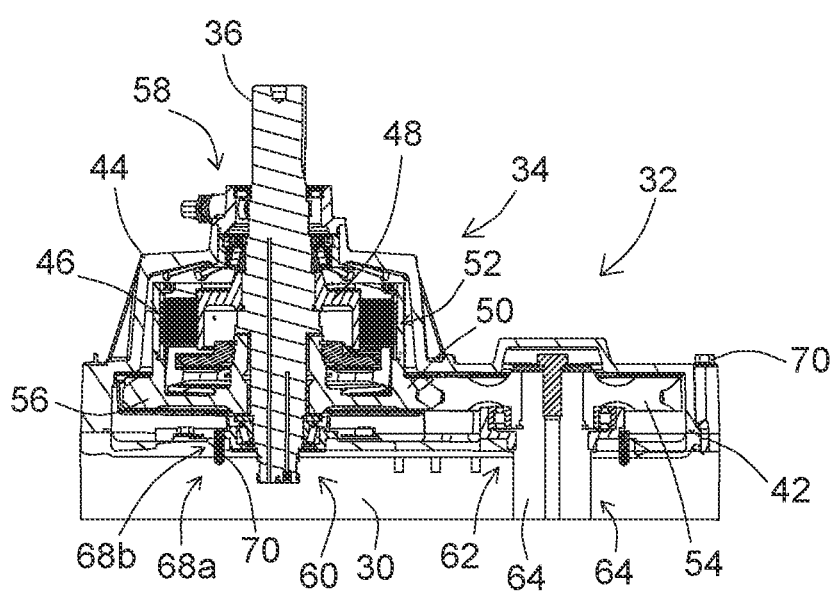
FIG. 3 shows a section along the line A-A through the hydraulic module and the clutch module according to FIG. 2 and FIGS. 4a-g show individual steps of the assembly of the hydraulic module or the clutch module on the transmission housing.

Reference is now also made to FIG. 3 of the drawing in which a section is shown through the clutch housing 44 and the clutch 46, which is arranged in the clutch housing 44, the front wheel drive 32 being able to be engaged thereby. The clutch 46 is configured in the known manner as a hydraulically actuatable multi-plate clutch with an inner and an outer plate carrier 48, 50 and a plurality of clutch plates 52. Moreover, the front wheel drive 32 has a first gearwheel 54 which is able to be set in rotation by the drive 24 and a second gearwheel 56 which permanently meshes with the first gearwheel 54.

The inner plate carrier 48 is fixedly arranged and the second gearwheel 56 is rotatably arranged on the front wheel drive shaft 36, which in turn is rotatably received via a first bearing 58 on the clutch housing 44 and via a second bearing 60 in the hydraulic module 30 or closing plate 42. The outer plate carrier 50 is connected fixedly in terms of rotation to the second gearwheel 56 which is arranged fixedly in terms of rotation on a transmission shaft 64 received in the closing plate 42 by a third bearing 62.

By activating the clutch 46 or subjecting the clutch 46 to hydraulic pressure, a non-positive connection is achieved between the clutch plates 52, which connects the second gearwheel 56 to the front wheel drive shaft 36, so that this front wheel drive shaft may be driven by the first gearwheel 54 or supplied with torque.

Reference is now made to FIGS. 4a-g, in which an assembly of the front wheel drive 32 or the components thereof is shown in a simplified manner.

Figure 4A:
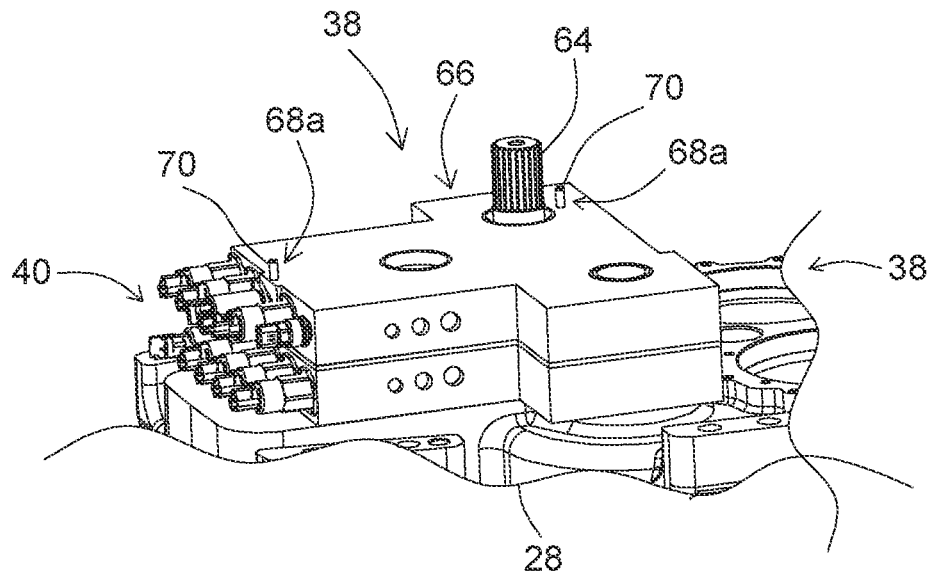

According to FIG. 4a in a first step, the connecting module 40 of the hydraulic module 38 is brought onto the transmission housing 28, wherein the transmission shaft 64 is passed through corresponding openings 66 in the connecting module 40. Locating pins 70 are received in locating openings 68a provided in the hydraulic module 30.

Figure 4B:
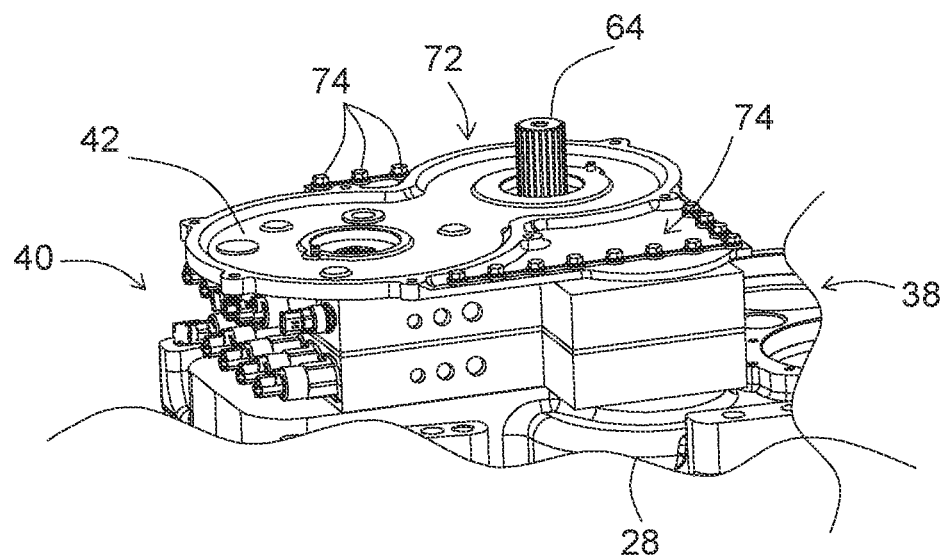

In a second step shown in FIG. 4b of the drawing, the closing plate 42 is brought onto the connecting module 40 such that the locating pins 70 correspond with corresponding openings 68b in the closing plate 42 in order to align the closing plate. The transmission shaft 64 is passed through an opening 72 in the closing plate 42. The closing plate 42, together with the connecting module 42, is now connected to the transmission housing 28 by a first fastening mechanism 74 configured as screws.

Figure 4C:
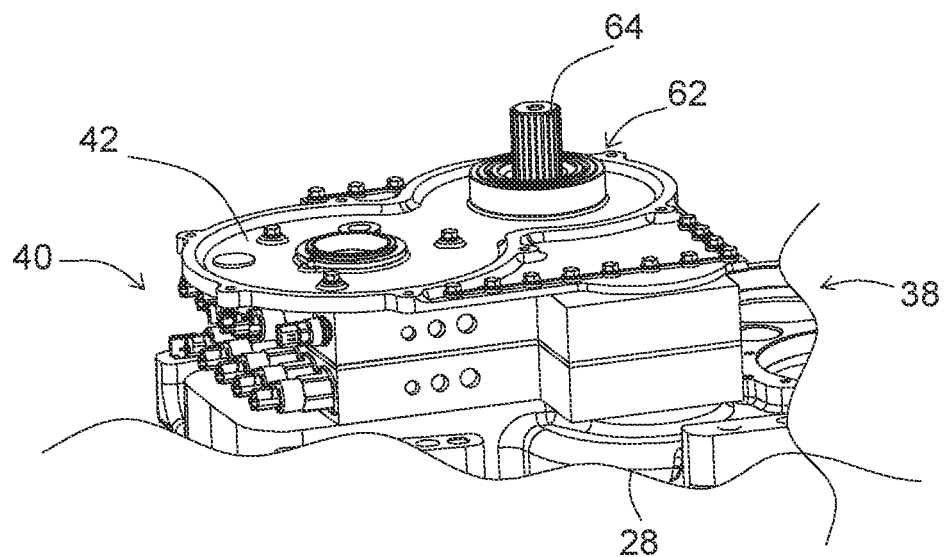
Figure 4D:
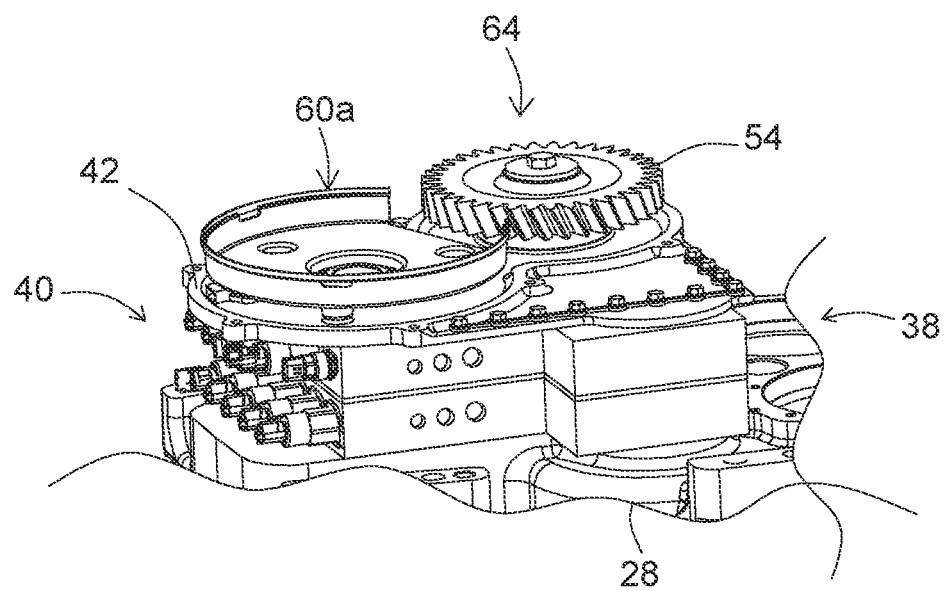
Figure 4E:
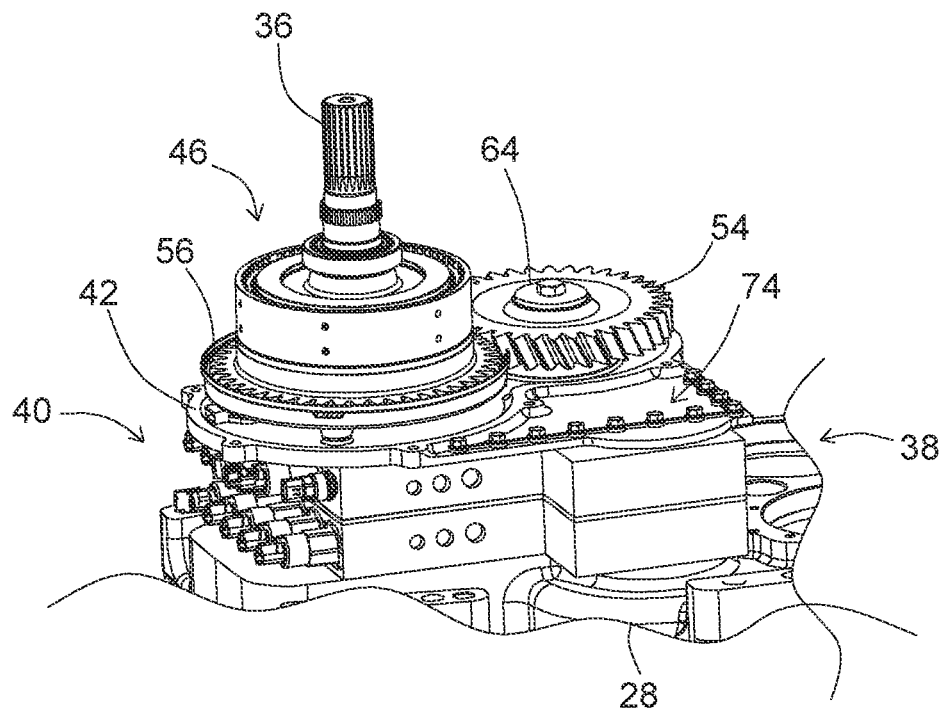

In a next, third working step shown in FIG. 4c, the third bearing 62 is introduced into the closing plate 42 and then, as shown in FIG. 4d, the first gearwheel 54 is assembled thereon. A bearing shell 60a of the second bearing 60 is also assembled thereon.

Figure 4F:
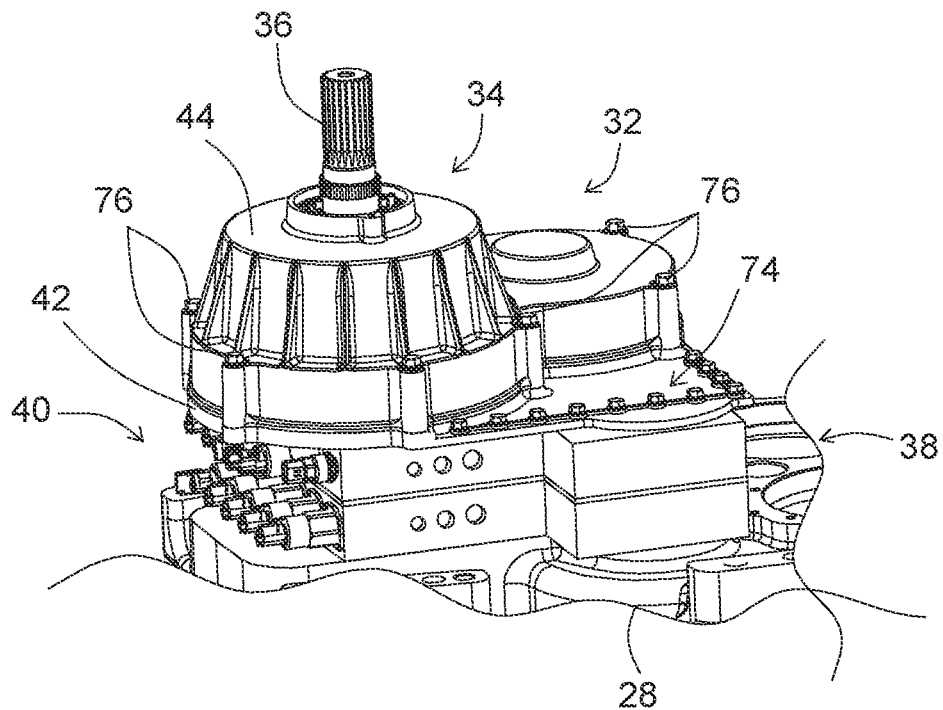
Figure 4G:
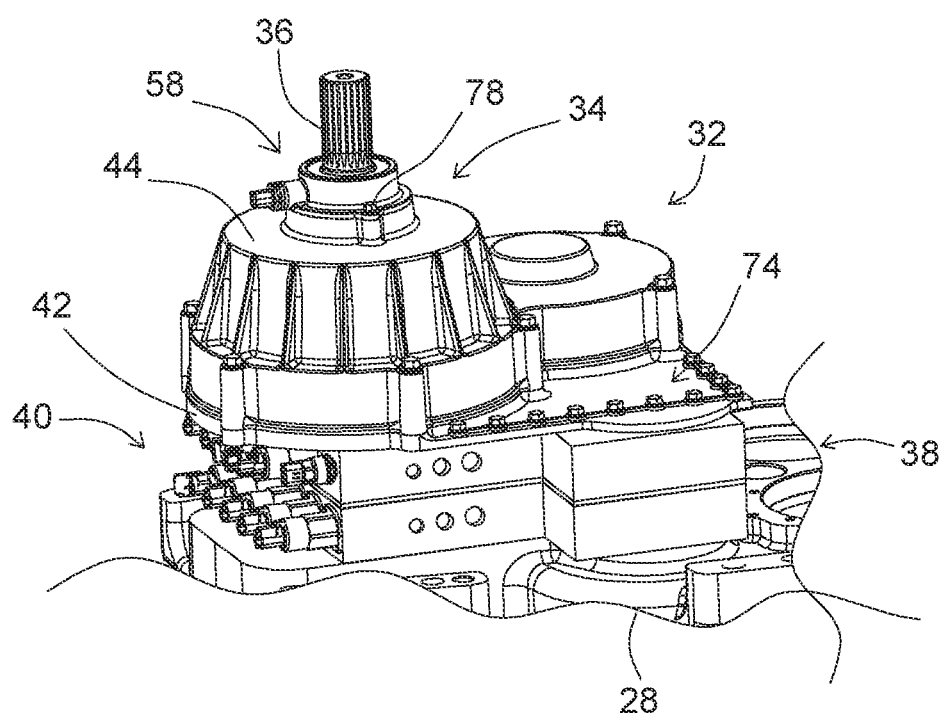

In step five of the assembly (see FIG. 4e), the clutch 46 is inserted with the front wheel drive shaft 36 into the bearing shell 60a. In the following step six, as is shown in FIG. 4f, the assembly takes place of the clutch housing 44 which encloses the components and which is connected to the closing plate 42 and the transmission housing 28 by a second fastening mechanism 76 configured as screws.

In the final step six, the assembly of the first bearing 58 which is connected to the clutch housing 44 also takes place via third fastening mechanism 78 configured as screws.

According to above description, for the dismantling procedure the aforementioned steps may be performed at least substantially in reverse sequence.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transmission subassembly for a working vehicle, comprising:
   an engageable front wheel drive;
   a transmission housing;
   a clutch module and a hydraulic module;
   wherein the hydraulic module is received between the clutch module and the transmission housing;
   wherein the hydraulic module comprises a connecting module and a closing plate; and
   wherein the closing plate comprises at least one bearing for supporting at least one shaft.

2. The transmission subassembly as claimed in claim 1, wherein the clutch module and the hydraulic module are located on a front region of the transmission housing.

3. The transmission subassembly as claimed in claim 1, wherein the clutch module and the hydraulic module are located on a region of the transmission housing facing the front wheels of the working vehicle.

4. The transmission subassembly as claimed in claim 1, wherein the connecting module adjoins the transmission housing.

5. The transmission subassembly as claimed in claim 4, wherein the closing plate adjoins the clutch module.

6. The transmission subassembly as claimed in claim 1, wherein at least one locating pin is disposed between the connecting module or the closing plate.

7. The transmission subassembly as claimed in claim 6, wherein the at least one locating pin cooperates with corresponding locating openings defined in the connecting module or the closing plate.

8. The transmission subassembly as claimed in claim 1, wherein the at least one shaft comprises a front wheel drive shaft or a transmission shaft.

9. The transmission subassembly as claimed in claim 1, further comprising at least one fastening mechanism for coupling the clutch module or the hydraulic module to the transmission housing.

10. The transmission subassembly as claimed in claim 1, further comprising at least one fastening mechanism for coupling the clutch module and the hydraulic module to the transmission housing.

11. The transmission subassembly as claimed in claim 10, wherein the at least one fastening mechanism comprises a screw connection.

12. The transmission subassembly as claimed in claim 1, wherein the clutch module includes a clutch housing for receiving a clutch, the clutch configured for engaging a mechanical front wheel drive.

13. The transmission subassembly as claimed in claim 12, wherein the clutch module includes a front wheel drive shaft extending at least substantially horizontally from the transmission housing in the direction of the front wheels.

14. A work vehicle, comprising:
   a chassis; one or more front wheels and rear wheels for supporting the chassis;
   a drive;
   a transmission subassembly comprising a transmission housing, a clutch module, and a hydraulic module;
   wherein the hydraulic module is received between the clutch module and the transmission housing;
   wherein the hydraulic module includes a connecting module and a closing plate, the connecting module adjoins the transmission housing, and the closing plate adjoins the clutch module; and
   wherein the closing plate comprises at least one bearing for supporting at least one shaft.

15. The work vehicle as claimed in claim 14, further comprising at least one locating pin is disposed between the connecting module or the closing plate, the at least one locating pin cooperating with corresponding locating openings defined in the connecting module or the closing plate.

16. A transmission subassembly for a working vehicle, comprising:
   an engageable front wheel drive;
   a transmission housing;
   a clutch module and a hydraulic module;
   wherein the hydraulic module is received between the clutch module and the transmission housing; and
   wherein the clutch module includes a clutch housing for receiving a clutch, the clutch configured for engaging a mechanical front wheel drive.

17. A transmission subassembly for a working vehicle, comprising:
   an engageable front wheel drive;
   a transmission housing;
   a clutch module and a hydraulic module, the clutch module including a clutch housing, a front wheel drive shaft, and a clutch for selectively connecting the front wheel drive shaft to a drive of the working vehicle; and
   wherein the hydraulic module is received between the clutch module and the transmission housing.

* * * * *